United States Patent Office 2,868,720
Patented Jan. 13, 1959

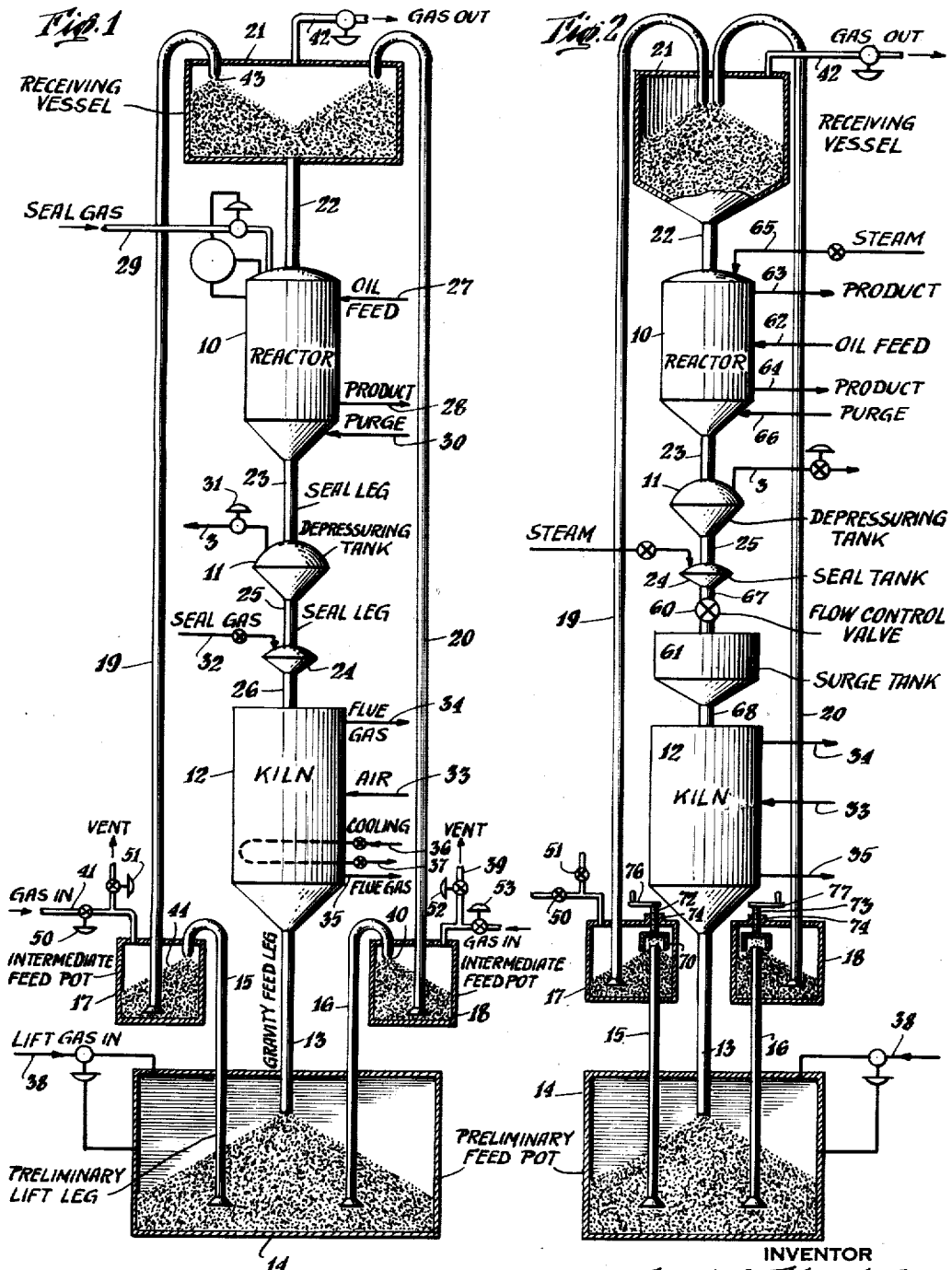

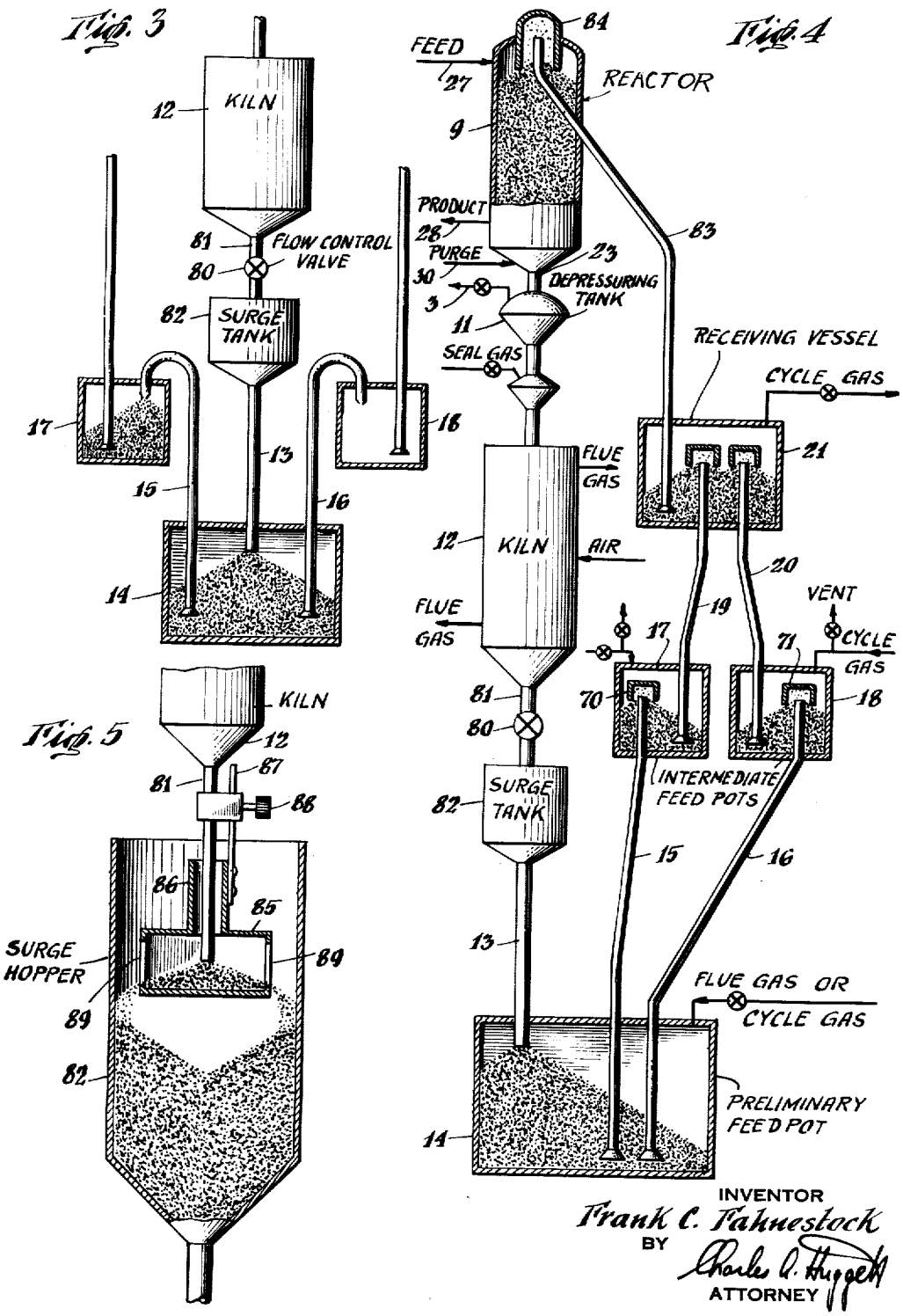

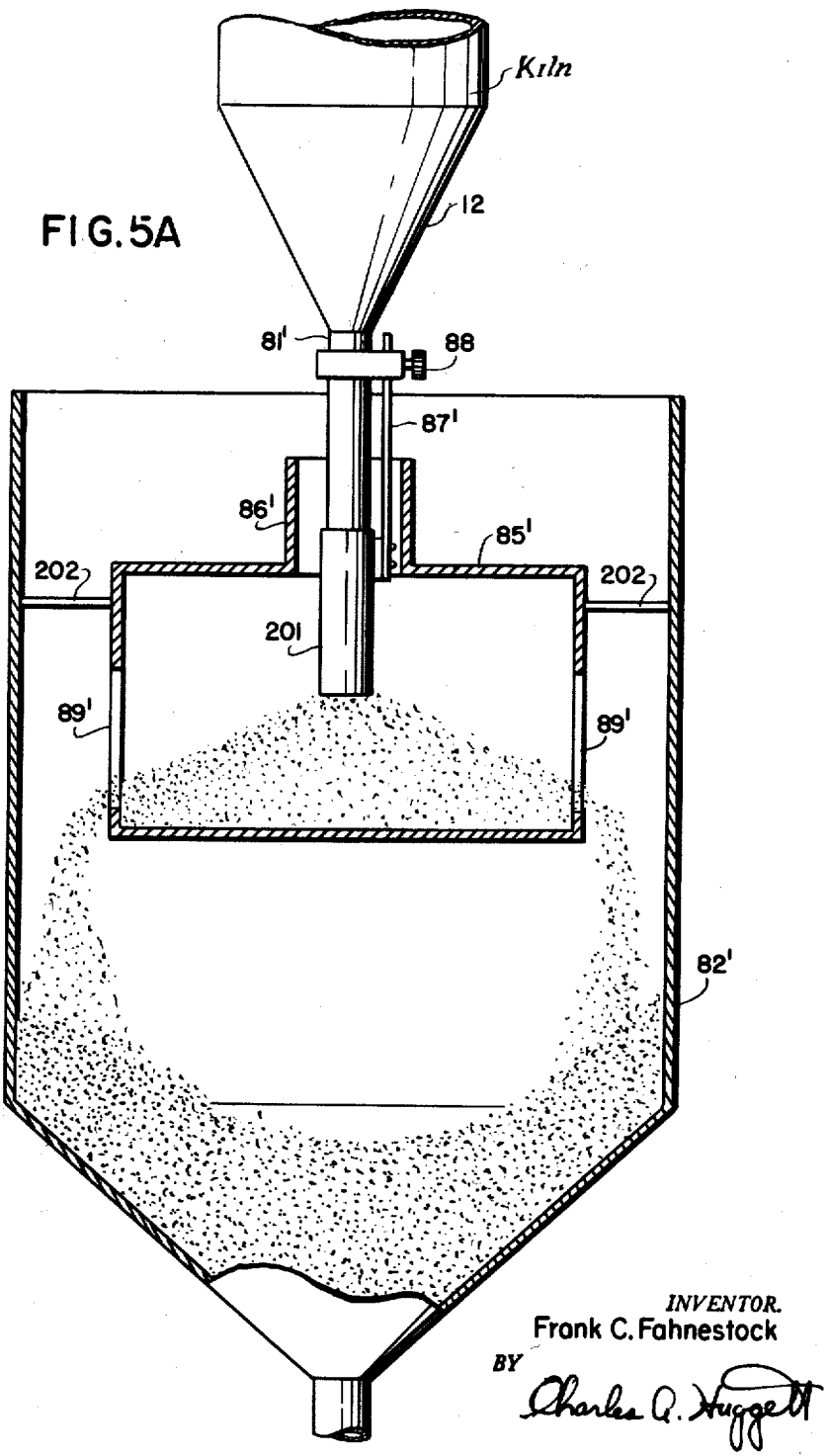

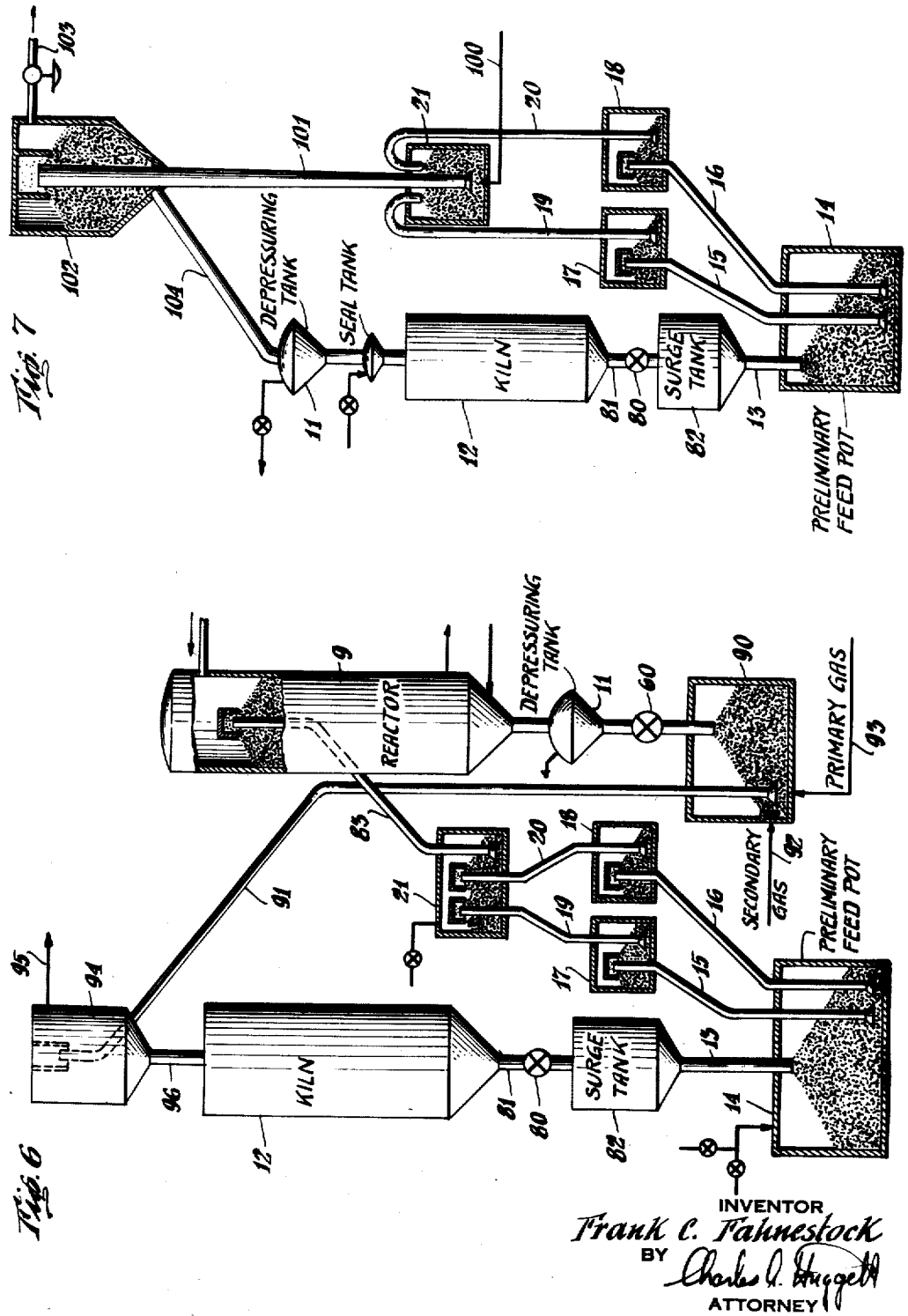

2,868,720

CONTINUOUS HIGH-PRESSURE CONTACTING OF FLUIDS WITH GRANULAR SOLIDS

Frank C. Fahnestock, Manhasset, N. Y., assignor to Socony Mobil Oil Company, Inc., a corporation of New York Application October 7, 1952, Serial No. 313,396

2 Claims. (Cl. 208—173)

This invention is concerned with the transfer of granular solids in a gas-solids contacting system which incorporates high and low pressure contacting zones.

In the petroleum industry many processes are known in which hydrocarbons are converted in the presence of a solid, particle-form material to more desirable substances. During the rearrangement of the structure of the hydrocarbons, the particles receive a deposit of carbonaceous material which must be periodically removed. In a preferred procedure, granular contact material is used, arranged in the form of gravitating substantially compact columns. The reactants are continuously introduced into a reaction zone and passed through the column of gravitating contact material. The zone is maintained at a suitable pressure and temperature for the conversion and converted products are continuously removed from the zone. The contact material is withdrawn from the bottom of the column and introduced onto the top of a column of the material in a reconditioning zone. A combustion-supporting gas, such as air, is introduced into the column in the reconditioning zone to burn off the carbonaceous deposits. The reconditioned contact material is withdrawn from the bottom of the reconditioning zone and returned to the top of the column in the conversion zone.

In some processes, the particles are partially or substantially inert and serve only as a heat carrier. The combustion of the contaminant in the regenerator is used to raise the temperature of the inerts and the hot contact material is continuously transferred to the reactor to provide heat for the reactions taking place therein. Inert heat carriers may be prepared from such material as corhart, mullite, coke, etc. Catalytic materials may be prepared from natural or treated clays, such as bauxite, or synthetic associations of silica, silica-alumina, silica-chromia, with or without additional metals. The particles may vary considerably in size, such as, for example, from about 1 inch to about 0.01 inch in diameter. For particular processes, certain size ranges have been found more acceptable. In cracking hydrocarbons, a preferred size range is about 4–10 mesh Tyler screen analysis. This size range is also suitable for reforming reactions wherein a stock boiling substantially in the gasoline boiling range is contacted with a catalyst to improve the octane rating of the fuel.

Continuous hydrocarbon conversion systems have been used for some time which incorporate a reactor for effecting the conversion reactions maintained at a pressure somewhat advanced over atmospheric and a regeneration vessel or kiln for reconditioning the solids maintained at about atmospheric pressure. For example, for catalytic cracking the reactor is usually maintained at about 15 p. s. i. (gauge) and the kiln is usually operated at substantially atmospheric pressure. An elongated conduit or feed leg is located above the reactor. The feed leg is made long enough so that a compacted column of the particles in the conduit will feed smoothly into the reaction vessel against the pressure in the vessel and the column will not be disrupted by escaping gas. It has been found undesirable to use valves, locks, or star wheels in the catalyst columns. The column acts as a seal in preventing the escape of vapor from the reactor through the feed leg. The seal may be improved by introducing an inert seal gas at substantially reactor pressure to the bottom of the feeding column. It has been found that about four feet of gravity feed leg is required for each pound of pressure differential across the leg. Therefore, a feed leg about 60–80 feet long is required for a reactor pressure of about 15 p. s. i. Recently, it has been proposed to use high reactor pressures for cracking, reforming and other processes. It is considered desirable to operate the kiln at substantially atmospheric pressure, or at least at a pressure substantially lower than the reactor. For example, the reactor may be operated at a pressure of about 60 p. s. i. for cracking reactions whereas the kiln may be operated at 2 p. s. i. This would require a gravity leg about 240 feet tall, making the unit unreasonably high. For reforming reactions where pressures as high as 200–300 p. s. i. have been found desirable, the use of a gravity feed leg for feeding the catalyst into the reactor has also been found impossible.

The object of this invention is to provide an improved method and apparatus for transferring a granular contact material through an enclosed cyclic system which includes a high pressure reactor and a low pressure regenerator.

It is a further object of this invention to provide an improved method and apparatus converting hydrocarbons continuously wherein the reaction zone is maintained at a pressure substantially higher than the reconditioning zone.

It is a further object of this invention to provide an improved method and apparatus for transferring a granular contact material from the bottom of a first zone maintained at low pressure to the top of a second zone maintained at high pressure.

These and other objects of the invention will be made more apparent by the following detailed description of the invention made with reference to the attached drawings showing suitable apparatus for carrying out the invention.

Figure 1 shows a reforming system, partially in section, in which the reactor is located above the kiln.

Figure 2 shows a cracking system, partially in section, in which the reactor is located above the kiln and a flow control valve is located in the conduit between the reactor and kiln.

Figure 3 shows a modified arrangement of the lower portion of the apparatus of Figure 1.

Figure 4 shows a reforming system in which the receiving vessel is located below the reactor.

Figure 5 shows a suitable flow control mechanism for controlling the downward gravitation of solids through the contacting vesesls.

Figure 6 shows a conversion system in which the reactor and kiln are located in side-by-side relationship.

Figure 7 shows a conversion system in which the conversion is effected in a gas lift.

In one broad aspect of the invention, a granular contact material is gravitated as a substantially compact mass through a reaction zone where it is contacted with hydrocarbons at high pressure to effect their conversion. The solids are withdrawn from the reaction zone and the pressure is reduced to nearly atmospheric pressure. The solids are then gravitated as a compact mass through a regeneration zone where they are contacted with air to effect combustion of contaminants on the surface of the solid material. The solids are gravitated as a compact column downwardly from the bottom of the regeneration zone into a preliminary feed zone to form a compact mass of particles in the zone. The preliminary feed zone is maintained at an advanced pressure which is high enough to force solids upwardly through an upwardly-directed passage into an intermediate feed zone when the pressure in said intermediate zone is reduced to atmospheric. The passage is terminated at its lower end below the mass of solids in said preliminary feed zone. The outlet of the pasage in said intermediate zone is restricted so that the solids in the passage are kept in substantially compact columnar form. The pressure in said preliminary feed zone is kept below the pressure which would disrupt the column of particles feeding downwardly from the regeneration zone into the preliminary feeding zone. Intermittently, the pressure is raised in said intermediate feed zone to a high level which prevents further transfer from the preliminary feed zone and causes solids to move upwardly through a passage from said intermediate feeding zone to an elevated receiving zone. The receiving zone is maintained at an elevated pressure, at least not substantially below the pressure in said reaction zone and in some instances, substantially higher than the pressure in said reaction zone. The outlet of the passage in said receiving zone is restricted to maintain the solids in said passage in substantially compact columnar form. As long as the passages are filled with contact material, the columns provide an excellent seal between the zones at radically different pressures. The interchange of gas between the zones through the columns is limited. The particles are not blown out of the passage between the preliminary and intermediate feeding zones because the gas, moving downwardly through the column, causes it to compact, thereby improving the seal and restricting the gas flow through this column. In a more preferred form of the invention, two intermediate feeding zones are used with connecting passages between the preliminary feeding zone and the receiving zone. They are operated alternately on high and low pressure so that one is filling at the same time the other is emptying. This provides a constant supply of solids to the receiving zone. The particles are then transferred from the receiving zone to the high pressure reaction zone. It is seen that the necessity for an elongated gravity feed leg above the reactor is obviated by this method of operation.

Referring now to Figure 1, a superposed conversion system is shown in which a high pressure reaction vessel 10 is located above a depressuring tank 11 and a low pressure kiln 12. Connecting conduits communicate the vessels in vertical series. An elongated conduit or gravity feed leg 13 is located below the kiln. A preliminary feed pot 14 is located at the bottom of the gravity feed leg. A pair of preliminary lift legs 15, 16 are located in side-by-side relationship with their lower ends terminated within the preliminary feed pot 14. A pair of intermediate feed pots 17, 18 are located at the upper ends of the preliminary lift legs. A pair of secondary lift legs 19, 20 are located in side-by-side relationship with their lower ends terminated within the intermediate feed pots and their upper ends terminated in a receiving vessel 21. The bottom of the receiving vessel is connected with the top of the reaction vessel by means of a short vertical conduit 22. The bottom of the reaction vessel is communicated with the top of the depressuring tank by the seal leg 23. A seal pot 24 is located below the pressuring tank. A seal leg 25 communicates the bottom of the depressuring tank with the top of the seal pot. A short conduit 26 communicates the bottom of the seal pot with the top of the kiln.

In operation this system may be used for high pressure catalytic cracking. The reactor 10 may contain a gravitating bed of catalyst under a pressure of about 50 p. s. i. An oil feed is introduced through the conduit 27 to pass downwardly through the voids in the bed and withdrawn through the conduit 28 as converted product. An inert seal gas is introduced through the conduit 29 into the uppermost portion of the reactor at a pressure of about 50½ p. s. i. to prevent reactants from travelling upwardly through a column of catalyst in the conduit 22. An inert purge gas is introduced into the lowermost portion of the reactor through the conduit 30 to purge the catalyst being withdrawn from the bottom of the bed of vaporizable hydrocarbons. The solids gravitate downwardly as a compact column through the conduit 23 and form a bed of solids in the depressuring tank 11. Gas is removed from the depressuring tank through the conduit 30, the valve 31 being automatically controlled to maintain the pressure in the tank at about 5 p. s. i. The solids are removed from the bottom of the tank through the conduit 25 as a substantially compact column and gravitated through the seal pot 24 and conduit 26 into the kiln 12, at a substantially constant pressure of about 5 p. s. i. A seal gas is introduced into the seal pot through the conduit 32 at a pressure of about 5½ lbs. to effectively seal the kiln from the depressuring tank. Solids are gravitated as a compact mass through the kiln and downwardly as an elongated restricted column through the gravitating feed leg 13 into the preliminary feed pot 14. Air is introduced through the conduit 33 into the middle portion of the kiln to travel upwardly and downwardly through the bed of solids to effect combustion of contaminants on the surface of the contact material and to prepare the material for reuse in the reaction zone. Flue gas is removed from the top and bottom of the kiln through the conduits 34 and 35. A cooling fluid is introduced into an indirect heat exchange system in the lower portion of the kiln through the conduit 36 and removed through the conduit 37. The temperature of the solids is thereby kept below that point at which the particles would be heat damaged by excessive temperature. A lift gas is introduced into the preliminary feed pot through the conduit 38 to maintain the vessel under an advanced pressure of about 8–12 p. s. i. The intermediate feed pot 18 is vented by means of the conduit 39 to reduce the pressure in the vessel to substantially 0 p. s. i. The pressure differential across the preliminary lift leg 16 is sufficient to effect the upward movement of solids through the leg into the intermediate feed pot to fill the vessel. The lift leg 16 has a restricting baffle 40 at its upper end which prevents solids from being blown out of the pipe and maintains the contact material in the pipe in substantially compact columnar form. While the tank 18 is filling, the tank 17 is placed under advanced pressure. Gas is introduced through the conduit 41 to raise the pressure in tank 17 to approximately 100 p. s. i. This prevents solids from moving upwardly in the conduit 15 and causes the particles in the pot 17 to be moved upwardly through the conduit 19 to the receiving vessel 21. Gas is withdrawn from the receiving vessel 21 through the conduit 42 at a controlled rate so as to maintain the pressure in the receiving vessel constant at about 51 p. s. i. The conduit 19 has a restricting baffle 43 located at its upper end so as to maintain the particles in the conduit in substantially compact columnar form. Prior to that time when the level of the bed of solids 44 falls below the lower end of the conduit 19, the pressure in the feed pot 17 is reduced to substantially zero, and the pressure in the alternate feed pot 18 is increased to approximately 100 p. s. i. It is seen, therefore, that the feed pots 17, 18 are alternately receiving catalyst from the preliminary feed pot 14 and delivering catalyst to the receiving vessel 21. The gravity feed leg 13 is terminated at its lower end above the level of the lower ends of the preliminary lift legs 15, 16 so that a bed of solids is maintained about the bottom of the preliminary lift legs at all times. This prevents the solids from being blown out of the preliminary lift legs when the intermediate feed pots are under high pressure. Valves 50, 51, 52 and 53 on the intermediate feet pots 17, 18 are arranged to operate in proper cycle and to be actuated in vessels 17, 18 to cause the intermediate feed pots to be filled or emptied of catalyst. Thus, the flow control is in the flow of solids from the preliminary feed pot 14 to the intermediate feed pots 17, 18. The pressure in the preliminary feed pot 14 is selected so that the flow through the preliminary lift legs is at the desired catalyst circulation rate. By increasing the pressure in the feed pot 14, the flow of catalyst through the entire system is increased.

Turning now to Figure 2, a similar system is shown in which a reactor 10, depressuring tank 11, seal pot 24 and kiln 12 are arranged in vertical series. Similar parts of the two systems have been given the same numbers and will not be described in further detail. A flow control valve 60 and surge tank 61 are located in a vertical series between the seal tank 24 and kiln 12.

In operation, a substantially compact mass of solids is gravitated downwardly from the receiving vessel 21, through a short conduit 22, into the reactor 10. In this system, oil feed is introduced into the reaction vessel at an intermediate level through the conduit 62, and converted product is removed from the top and bottom of the reaction vessel through the conduits 63, 64. Steam is introduced into the topmost portion of the vessel through the conduit 65 to serve as a sealing gas and an inert gas is introduced into the bottom of the vessel through the conduits 66 to purge the particles being withdrawn therefrom. The reactor is maintained under a pressure of about 100 p. si. i. The solids are gravitated in compact columnar form through the conduit 23 into the depressuring tank 11, where the pressure is reduced to about 2 p. s. i. The solids are gravitated in substantially compact columnar form through the conduit 25, seal pot 24 and conduit 67 down to the level of the flow control valve 60. The flow control valve 60 is used to control the rate at which the particles are gravitated downwardly through the reaction vessel. The solids are discharged in freely-falling condition at the level of the flow control valve through the remainder of the conduit 67 into the surge tank 61. The particles fall on the top of the bed of the solids maintained in the surge tank and are gravitated in substantially compact condition from the bottom of the surge tank to the connecting conduit 68, into the kiln 12. The pressure in the preliminary feed pot 14 is maintained at about 10 p. s. i. Caps 70, 71 are located on shaft 72, 73 in a position about the upper end of the preliminary lift legs 15, 16. The shaft 72, 73 passes through bosses 74, 75 in the wall of the vessels 17, 18. External threads on the shafts 72, 73 engage internal threads on the bosses 74, 75 so as to permit vertical movement of the shafts. Cranks 76, 77 are used to locate the vertical position of the caps 70, 71 above the preliminary lift legs 15, 16. The caps 70, 71 are adjusted so that the solids passing through the preliminary lift legs 15, 16 are maintained in substantially compact columnar form at all times. The gas pressure in the intermediate feed pot 17, 18 is alternated between zero and 150 lbs. When the intermediate feed pots are under pressure, there is a sufficient pressure differential to move catalyst upwardly through the secondary lift legs 19, 20 to the receiving vessel 21. The flow control valve 60 is adjusted to provide the desired flow rate of contact material through the reactor and a substantially compact continuous column of catalyst is maintained upwardly from the valve through the reactor to the discharge or outlet ends of the secondary lift legs 19, 20. The catalyst column, therefore, limits the flow of catalyst through the secondary lift legs to that required to just maintain the top of the column at the upper end of the secondary lift legs. The rate of cycle change in the intermediate feed pots is adjusted by suitable control of the valves 50, 51, responsive to any change in flow rate by the valve 60, so that the feed pot is never drained of catalyst during the pressure portion of the cycle. The only place in which a variable bed level is found in this system is in the surge tank 61, just below the flow control valve 60. Throughout the remainder of the system, the catalyst moves in substantially compact columnar form at a rate which is controlled by the adjustment of the valve 60.

Figure 3 shows a modification of the lower section of the apparatus combination in Figure 1. Similar parts have been given similar numbers, and will not be described in further detail. In this embodiment of the invention, a flow control valve 80 is located in the conduit 81 below the kiln 12. A surge tank 82 is located below the flow control valve and a gravity feed leg 13 connects the bottom of the surge tank with the preliminary feed pot 14. With this arrangement, pressure in the preliminary feed pot 14 is maintained constant and the gas valves controlling the gas pressure in the intermediate feed pots 17, 18 are controlled on a fixed cycle. In this embodiment, the catalyst moves through the enclosed path in substantially compact form with the exception of that portion of the path between the flow control valve and the top of the catalyst bed in the surge tank 82. If the valve 80 is opened wider, flow of catalyst through the kiln, reactor and receiving vessel is increased. This leaves more room in the receiving vessel for flow from intermediate feed pots 17, 18 during the high pressure cycle. Removal of catalyst from the intermediate feed pots 17, 18 leaves more room in these pots for catalyst to flow from the preliminary feed pot 14, when the pressure in the intermediate feed pots is reduced.

Referring to Figure 4, a system is shown similar to that described with reference to Figure 3 but differing by the fact that the receiving vessel is located below the reactor or reaction vessel. Similar parts of the two systems have been given similar numbers, and will not be described in further detail. In this instance, the reactor may be operated at a pressure of about 175 p. s. i. and the catalyst depressured in the tank 11 to about 5 p. s. i. The kiln 12 is operated at about 5 p. s. i. and the preliminary feed pot 14 is operated at about 10 p. s. i. The intermediate feed pots 17, 18 are operated on an alternating cycle between zero p. s. i. and 240 p. s. i. The receiving vessel 21 is maintained at a constant pressure of about 225 lbs. This pressure is sufficiently advanced over the pressure in the reactor to push catalyst in substantially compacted form through the upwardly-directed conduit 83 into the bell-shaped housing 84, located in the top of the reactor. Catalyst, therefore, flows continuously from the receiving vessel to the reactor at a flow rate controlled by valve 80, located below the fliln. Catalyst flowing from the intermediate feed pots 17, 18 through the conduits 19, 20 keep the receiving vessel substantially full at all times. Catalyst is delivered from the preliminary feed pot to the intermediate feed pots as space is provided in the intermediate feed pots. The downward flow of catalyst from the surge tank 82 provides a substantially compact bed of catalyst in the preliminary feed pot at all times. As the catalyst inventory in the system decreases, the level of catalyst in the surge tank 82 falls. This level can be raised by supplying fresh catalyst to the system.

Figure 5 shows an apparatus combination adapted to serve as a flow-control valve in the place of valve 80 in the system of Figure 4. In this arrangement, a flow-control box 85 is located about the bottom of the conduit 81. The box 85 has an upwardly-directed conduit 86 which is substantially coaxial with the conduit 81. The conduit 86 and box 85 may be raised or lowered by adjustment of the connecting rod 87 and set screw 88. Catalyst is delivered in substantially columnar form through the conduit 81 to form a bed of catalyst in the box 85. Vertical slots 89 are located in the side wall of the box 85 and catalyst is discharged through these slots into the interior of the surge hopper 82. It is seen that the box 85 will deliver a greater flow rate of catalyst when the box is in the low position, so that substantially all of the area of the slots is delivering catalyst. The catalyst bed in the box 85 will form a surface at the angle of repose of the catalyst, usually about 30° with the horizontal. Therefore, when the box is raised with respect to the conduit 81, a smaller area of the slots 89 will be delivering catalyst and the flow rate of the catalyst will be decreased. Alternatively, the box 85 may be located in a fixed position, and the conduit 86 may be raised or lowered to effectively raise or lower the discharge end of the conduit 81. The catalyst drops freely after passage through the slot 89 onto the surface of the bed of catalyst in the lower portion of the surge hopper 82. Figure 5A shows this alternate form of apparatus. The box 85' is located about the bottom of the conduit 201 in a fixed position. The braces 202 support the box 85' in a permanent location within the hopper 82'. The box 85' has an upwardly-directed conduit 86' which is substantially coaxial with the conduit 201. The conduit 201 is larger in diameter than the conduit 81' and surrounds the conduit 81' so that it can be raised or lowered by adjustment of the connecting rod 87' and set screw 88'. Catalyst is delivered in substantially columnar form through the conduits 81' and 201 to form a bed of catalyst in the box 85'. Vertical slots 89' are located in the side wall of the box 85' and catalyst is discharged through these slots into the interior of the surge hopper 82'. It is seen that the box 85' will deliver a greater flow rate of catalyst when the telescoping conduit 201 is in the raised position, so that substantially all of the area of the slots is delivering catalyst. The catalyst bed in the box 85' will form a surface at the angle of repose of the catalyst, usually about 30° with the horizontal. Therefore, when the telescoping conduit 201 is lowered with respect to conduit 81', a smaller area of the slots 89' will be delivering catalyst and the flow rate of the catalyst will be decreased.

Referring now to Figure 6, a hydrocarbon conversion system is shown in which the kiln 12 and reactor 9 are located in side-by-side relationship. Catalyst is delivered downwardly through the kiln 12 at a pressure of about 2 p. s. i., and the flow of catalyst is controlled by the valve 80 in the conduit 81 located between the kiln 12 and surge tank 82. The preliminary feed pot receives catalyst from the surge tank through the gravity feed leg 13 and delivers it alternatively through the preliminary lift legs 15, 16 to the intermediate feed pots 17, 18, as previously disclosed. Catalyst is then moved in slugs alternatively through the secondary lift legs 19, 20 to the receiving vessel 21. The pressure in the preliminary feed pot may be about 15 p. s. i. and the pressure in the intermediate feed pots may vary between pressures of about zero p. s. i. and 250 p. s. i. The receiving vessel 21 in this showing is located below the reactor 9 and connected with reactor 9 by means of an upwardly-directed conduit 83. The pressure in the receiving vessel may, therefore, be maintained at about 225 p. s. i. and the pressure in the reactor maintained at about 200 p. s. i. This provides a conceiving vessel to the reactor at a flow rate sufficient to keep the level of the catalyst in the reactor at the upper end of the conduit 83. Catalyst is gravitated in substantially compact form through the reactor, conduit 23, depressuring tank 11, down to the valve 60. The valve 60 is used to control the rate of catalyst flow through the entire system. The catalyst is discharged below the valve 60 into the lift tank 90 and forms therein a substantially compact mass of catalyst about the lower end of an upwardly-directed lift pipe 91. Lift gas may be introduced into the lift tank 90 through the conduit 92 as secondary gas, or conduit 93 as primary gas, or through both conduits to suspend the catalyst beneath the lift pipe 91 and lift it in a rapidly-flowing stream of gas through the conduit 91 to the separator 94 located atop the kiln. The lift gas is withdrawn from the separator through the conduit 95 and catalyst is gravitated from the lower portion of the separator through the conduit 96 in substantially compact columnar form to continuously replenish the catalsyt bed in the kiln 12. The pressure drop across the dilute phase lift 91 used in this embodiment of the invention may be a matter of only a few pounds, such as 1–3 p. s. i., approximately.

Referring now to Figure 7, an alternate embodiment of the invention is shown. A substantially compact column of catalyst is gravitated downwardly through the kiln 12 at a flow rate controlled by the valve 80 in the conduit 81. The catalyst is discharged freely below the valve 80 into the surge tank 82 to form there a bed of catalyst for maintaining the catalyst level in the preliminary feed pot 14 substantially constant. The preliminary feed pot may be maintained at a pressure of about 10 p. s. i. and catalyst delivered through the preliminary lift legs 15, 16 in alternating slugs to the intermediate feed pots 17, 18. The pressure in the intermediate feed pots may vary between about zero p. s. i. and 130 p. s. i. Catalyst will then be delivered in alternating slugs through the secondary lift legs 19, 20 to the receiving vessel 21. The receiving vessel 21 may be maintained at a constant pressure of about 100 p. s. i. In this embodiment of the invention, a hydrocarbon feed is supplied to the receiving vessel 21 via the conduit 100, and this feed serves as lift gas to suspend the particles and transfer them upwardly through the reacting tube 101 to a separating vessel 102. The reacting tube 101 can, therefore, be used for conducting short-time conversion reactions, such as the conversion of ethane to ethylene, over a dehydrogenating catalyst as well as for upward movement of the catalyst into the separating vessel 102. The converted hydrocarbons are removed from the separating vessel via the conduit 103 and the catalyst is gravitated in substantially compact form, through the conduit 104, depressuring tank 11, and into the kiln to refurnish the bed of catalyst in the kiln 12.

It is to be understood that the specific examples of apparatus, design and arrangement, and of operation and application of this invention are intended only as illustrative of the invention, and it is intended to cover all changes and modifications of the examples herein chosen for purposes of disclosure which do not constitute departure from the spirit and scope of the invention.

I claim:

1. In a moving bed conversion process in which a granular contact material is gravitated as a substantially compact column through at least one contacting zone where the solids are contacted with a reactant fluid at high temperature, the improved method of controlling the flow rate of the gravitating contact material which comprises: gravitating solids from the bottom of said contacting zone through a laterally-confined passage, discharging the solids from the bottom of said passage into a confined zone, to form a pile of solids on the floor of said zone extending upwardly to cover at least the lower portion of the sidewall of said zone and at least partially block the flow of solids from said passage, discharging solids from said pile through a portion of at least one substantially vertical slot in the side wall of said confined zone onto the top of a pile of solids in a surge zone, the surface of the pile of solids in said surge zone being far enough below the confined zone to permit the solids to flow freely through said slot, gravitating contact material downwardly from the bottom of said surge zone, and varying the distance between the bottom of said passage and the bottom of said confined zone, in order to adjust the flow rate of solids through said slot to the desired flow rate in said contacting zone.

2. In a moving bed hydrocarbon conversion system in which a granular contact material is gravitated downwardly as a compact mass through a contacting vessel, means for controlling the flow rate of solids through the vessel comprising in combination: a downwardly-directed discharge conduit beneath said contacting vessel, a particle-confining box about the lower end of said conduit, a telescoping sleeve about the lower end of said conduit, means for raising or lowering the sleeve, to effectively lengthen or shorten the effective length of the conduit, means defining vertical slots in the side wal of said confining box, a surge hopper located below the confining box, so as to catch particles issuing through the slots in said confining box and a conduit below said surge hopper, for withdrawing solids from said hopper.

References Cited in the file of this patent

UNITED STATES PATENTS

| | | |
|---|---|---|
| 727,030 | Tilghman | May 5, 1903 |
| 2,412,152 | Huff | Dec. 3, 1946 |
| 2,423,411 | Simpson | July 1, 1947 |
| 2,446,986 | Simpson | Aug. 10, 1948 |
| 2,509,983 | Morrow | May 30, 1950 |
| 2,546,625 | Bergstrom | Mar. 27, 1951 |
| 2,676,142 | Crowley | Apr. 20, 1954 |
| 2,684,390 | Bills | July 20, 1954 |
| 2,684,868 | Berg | July 27, 1954 |
| 2,684,872 | Berg | July 27, 1954 |
| 2,684,928 | Berg | July 27, 1954 |
| 2,684,930 | Berg | July 27, 1954 |

OTHER REFERENCES

"New Lift Technique," Weber, Oil and Gas Journal, page 75, August 11, 1952.

Othmer: Fluidization, Reinhold Publishing Company (1956), pp. 162, 163, abstracted from Trans. Am. Inst. Chem. Engrs. 42, 665 (1946).

UNITED STATES PATENT OFFICE
CERTIFICATE OF CORRECTION

Patent No. 2,868,720                          January 13, 1959

Frank C. Fahnestock

It is hereby certified that error appears in the printed specification of the above numbered patent requiring correction and that the said Letters Patent should read as corrected below.

Column 6, line 46, for "fliln" read -- kiln --; column 7, line 52, after "a" strike out the syllable and hyphen "con-" and insert instead -- continuously-moving upward stream of catalyst from the re- --.

Signed and sealed this 12th day of May 1959.

(SEAL)

Attest:

KARL H. AXLINE                                      ROBERT C. WATSON

Attesting Officer                                  Commissioner of Patents